United States Patent [19]
Sharples

[11] Patent Number: 5,797,379
[45] Date of Patent: Aug. 25, 1998

[54] FUEL DELIVERY SYSTEM

[75] Inventor: Leigh William Sharples, Mordialloc, Australia

[73] Assignee: Gasresearch Australia Pty. Ltd., Australia

[21] Appl. No.: 715,768

[22] Filed: Sep. 19, 1996

Related U.S. Application Data

[63] Continuation of Ser. No. 557,698, Nov. 13, 1995, which is a continuation of Ser. No. 204,282, filed as PCT/AU92/00542 Nov. 12, 1992, published as WO93/08398 Apr. 29, 1993, abandoned.

[30] Foreign Application Priority Data

Oct. 16, 1991 [AU] Australia .......................... PK 8950

[51] Int. Cl.$^6$ .......................................... F02M 21/04
[52] U.S. Cl. ........................ 123/527; 48/144; 48/180.1
[58] Field of Search ........................ 123/527, 525, 123/526; 48/144, 180.1

[56] References Cited

U.S. PATENT DOCUMENTS

| | | | |
|---|---|---|---|
| 2,073,276 | 3/1937 | Ensign | 123/527 |
| 2,717,827 | 9/1955 | Best | 48/144 |
| 2,815,013 | 12/1957 | McClain | 123/527 |
| 4,285,700 | 8/1981 | Fox | 123/527 |
| 4,494,515 | 1/1985 | Brown | 123/527 |
| 4,638,783 | 1/1987 | Snyder | 123/527 |
| 4,841,941 | 6/1989 | Parietti | 123/527 |
| 4,953,516 | 9/1990 | van der Weide et al. | 123/527 |
| 4,991,561 | 2/1991 | Gerassimov et al. | 123/527 |
| 4,997,458 | 3/1991 | Jones | 123/527 |
| 5,255,657 | 10/1993 | Stellwagen | 123/527 |

FOREIGN PATENT DOCUMENTS

| | | | |
|---|---|---|---|
| 50137/69 | 8/1970 | Australia . | |
| 866372 | 8/1941 | France | 48/180.1 |
| 866826 | 9/1941 | France . | |
| 885005 | 9/1943 | France . | |
| 3221563 | 12/1983 | Germany . | |
| 187211 | 1/1937 | Switzerland | 48/180.1 |

*Primary Examiner*—Erick R. Solis
*Attorney, Agent, or Firm*—Baker & Daniels

[57] ABSTRACT

A carburetor for low pressure gaseous fuel comprising: a hollow body having a through bore, a venturi in said through bore, a throttle valve downstream of said venturi, a jet positioned in the venturi, said jet connected to a gaseous fuel supply, a flow control valve interposed between said jet and said fuel supply, said control valve being operatively connected to the throttle valve such that movement of the throttle valve causes translation of a valve element in a gas port whereby the area of the port is varied to regulate the flow of gaseous fuel to the jet in direct proportion to movement of the throttle valve.

19 Claims, 9 Drawing Sheets

SIDE VIEW

FRONT VIEW

FUEL DELIVERY SYSTEM

This is a continuation of application Ser. No. 08/557,698, filed Nov. 13, 1995, which is a continuation of application Ser. No. 08/204,282, filed as PCT/AU92/00542 Nov. 12, 1992, published as WO93/08398 Apr. 29, 1993 all abandoned.

FIELD

The present invention relates to the field of fuel delivery systems, particularly for internal combustion engines. In particular, the present invention deals with a system for providing a fuel and air gaseous mixture ready for combustion.

BACKGROUND ART

In order to reduce fuel costs, many internal combustion engines particularly those used in automotive vehicles, have been adapted to run on gaseous fuels, such as CNG or LPG fuels, rather than more expensive liquid fuels, such as petrol or diesel.

The engines are 'converted' to gaseous operation, usually by the addition of a regulator vaporiser, mixer and manifold (s). These components serve to convert the high pressure gaseous fuel stored in onboard fuel tanks to a lower pressure fuel which, when mixed with air, provides a fuel/air mixture ready for combustion by the engine.

A difficulty with existing converted engines is that a significant reduction in power output of the engine is noticed after the engine is converted to run LPG or CNG fuels. This is often due to poor fuel/air mixtures being fed to the engine. Fuel is thus not combusted under optimum conditions. Also, the ratio of fuel to air in the mixture which is combusted by the engine is determined external of the engine carburettor or fuel injection system, where liquid fuels are usually mixed. Accordingly, little, if any, control of fuel/air ratios throughout the entire operating range of the engine is undertaken.

Prior art systems utilise manifold vacuum to control a diaphragm which regulates flow of gaseous fuel. Accordingly, when the engine is started, a vacuum must be created in the engine before the diaphragm allows fuel flow into the engine. This results in relatively lengthy engine cranking times. Restrictive hoses and connectors are used between the diaphragm and engine manifold in order to gain greater vacuum, and thus more responsive diaphragm control. Prior art systems use engine manifold vacuum to suck gaseous fuel into the carburetor.

However, when the engine is running at relatively high speed, the restrictive hoses serve to reduce the amount of fuel flowing to the engine. Furthermore, as the speed of the engine increases, the manifold vacuum decreased, which in turn serves to increase the richness of the fuel flow to the engine. A reduction in performance and economy is thus noticeable.

Poor engine performance may also be attributable to poor mixing or ratios of the fuel and air. In some known arrangements, the gaseous fuel is allowed to dribble down the inside surface of the carburetor venturi. The fuel remains in close proximity to the carburetor walls, and does not mix adequately with the air passing through the carburetor venturi.

Furthermore, not an insignificant amount of fuel is wasted when the engine is de-accelerating as diaphragm control systems are relatively slow to reduce fuel/air mixture passing to a deaccelerating engine. A danger of fuel leakage may also occur when the engine has been switched off. Gaseous fuel which is present in the conversion equipment may be allowed to bleed through the engine and out the engine exhaust uncombusted.

OBJECT

An object of the present invention is to provide a fuel delivery system which alleviates at least one disadvantage of the prior art.

A further object of the present invention is to provide a fuel delivery system which enables satisfactory control of fuel and air ratios throughout the entire operating range of the engine.

A still further object of the present invention is to provide a fuel delivery system which may be calibrated for each particular engine it is fitted to.

Yet another object of the present invention is to provide a fuel delivery system which enables an engine to consume substantially less fuel than existing gaseous fuel systems, and/or alleviate the reduction in power output of the engine due to the conversion to gaseous fuels.

SUMMARY OF INVENTION

The present invention provides a stream of combustible gaseous fuel material directly into an air stream path in relatively close proximity to the engine. In this way, the present invention in one form provides the gaseous fuel material directly to and for mix in a carburetor arrangement; the fuel material being mixed in the carburetor with air to an appropriate fuel/air mixture for combustion by the engine.

The present invention utilizes air velocity to create a relatively low pressure area into which low pressure area gaseous fuel is drawn. The provision of the low pressure area is not directionly proportional to or regulated by manifold vacuum.

The present invention is predicated on the realization that a diffuser venturi in combination within a carburetor or throttle body of an engine can provide such a low pressure area. The diffuser creates an acceleration of air in the throttle body, which creates a low pressure area, causing air to be drawn through the venturi into the low pressure area. An induction tube enables the introduction of gaseous fuel and is fitted into the venturi. Thus gas is also drawn to the low pressure area. Mixing of gaseous fuel and air occurs in the low pressure area. This air/fuel mix leaves the venturi and is further mixed with the accelerated air passing around the diffuser. The resultant air/fuel mix is then passed to the engine for combustion.

An advantage of the present invention is that the air velocity over the diffuser creates the vacuum required and thus the air/fuel combustion mix is not directly reliant on manifold vacuum created by the engine, which manifold vacuum does vary greatly under normal driving conditions.

If an engine is considered as a constant displacement pump due to the action of the pistons; each piston draws a certain and defined quantity of air and/or fuel at each stroke. This action draws the certain quantity of air past the diffuser of the present invention (not directly related to manifold vacuum) and thus a low pressure area as noted above is created.

The present invention thus provides an improvement in a carburetor having a hollow main body portion through which a stream of air is adapted to enter at one end, the improvement comprising a venturi and diffuser in combination adapted to creat in use a low pressure area in conjunction with the hollow main body.

The present invention also provides a fuel delivery device for use with internal combustion engines, and adapted to deliver relatively low pressure gaseous fuel for combustion by said engine, said device comprising a venturi and diffuser in combination adapted to create in use a relatively low pressure area into which said gaseous fuel is adapted to be drawn.

The present invention is predicated on the discovery that air velocity through the carburetor can draw in and mix gaseous fuel rather than manifold vacuum. A venturi provides, in one form, a preferred arrangement for gaseous fuel/air mixing.

Furthermore, it has been surprisingly found that by jetting the low pressure gaseous fuel directly into the air flow path through a venturi-type device, such as a carburetor, substantial enhancement in power output of the engine is achieved. Mixture of fuel and air is thus enhanced.

Surprisingly, it has also been found that a significant economy is achievable in the amount of fuel consumed by utilizing a valve arrangement to regulate the amount of low pressure gaseous fuel delivered to the engine. Preferably, the valve arrangement is a needle and seat arrangement. Control of the air-fuel ratio throughout the entire operating range of the engine can also be achieved by contouring a projection in the valve to a desired outer configuration, which therefore controls the amount of gaseous fuel passing through the valve.

The present invention also provides a valve for regulating the supply of a low pressure gaseous fuel to an engine for combustion, said valve being operably coupled to a butterfly valve of a carburetor fitted to said engine.

It has also been surprisingly found that by controlling operation of the gaseous fuel valve in conjunction with operation of the carburetor butterfly valve, a significant improvement in fuel economy is achieved through the reduction in the amount of unburnt gases passing through the engine and out to exhaust.

The configuration of the valve of the present invention further enables the valve to be located in relatively close proximity to the carburetor fitted to an engine. This close fitment further reduces drag forces on the flow of gaseous fuel to the carburetor.

The present invention provides a carburetor adapted to mix a gaseous fuel and air in order to provide a combustible fuel/air mix, said carburetor comprising:

fuel inlet means adapted to provide gaseous fuel into an air stream, said inlet means being further adapted to regulate the amount of fuel passing into said air stream in accordance with the velocity of said air stream.

The present invention also provides a fuel delivery system comprising in combination the carburetor and the valve described above.

BRIEF DESCRIPTION OF THE DRAWINGS

A preferred embodiment of the present invention will now be described with reference to the accompanying drawings, wherein:

FIG. 3A shows an enlarged view of a component part of the valve of the present invention;

Like numerals in the drawings denote like component parts of the present invention.

DETAILED DESCRIPTION

Figure 1:
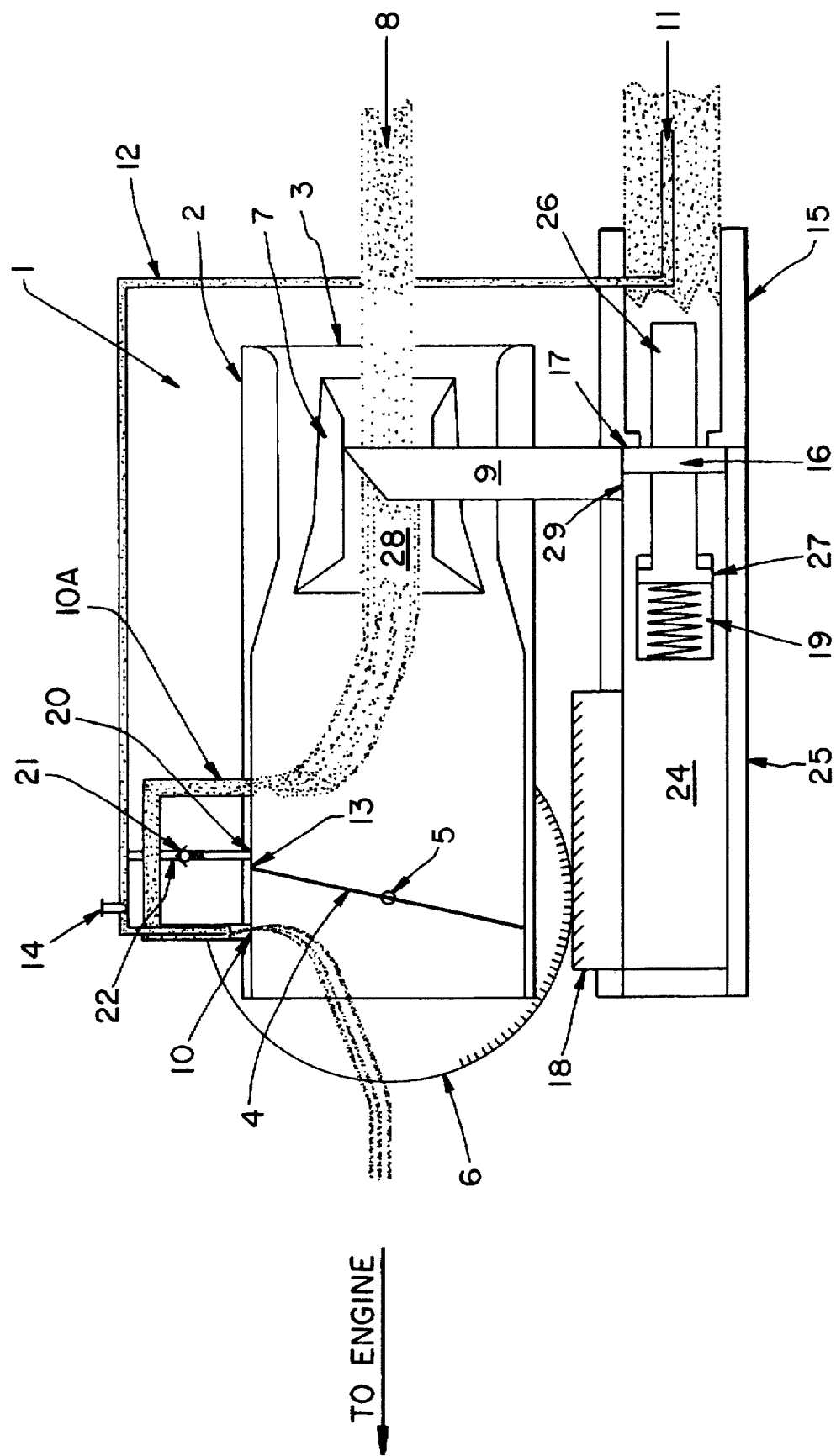
FIG. 1 shows, in combination, the carburetor and valve of the present invention at an engine idle setting.

In general, the Figures show a preferred form of the present invention in which the carburetor 1 has a hollow main body portion 2, which includes a venturi 3 at one end of the body portion 2.

At the other end of the carburetor 1, there is provided a butterfly valve 4, which serves to control the flow of gaseous fuel/air mixture to the engine for combustion. The butterfly valve 4 pivots about shaft 5. Gear 6 is also coupled to shaft 5. In an automobile, the accelerator pedal (not shown) is usually coupled via a cable mechanism to shaft 5. Acceleration and deceleration of the engine is controlled by movement of the butterfly valve 4. Operatively coupled to the gear 6 is a rack 18 which serves to proportionately control movement of fuel valve 15. Fuel valve 15 serves to regulate the flow of gaseous fuel 11 into jet 9 for mixture with incoming air flow 8.

A bypass fuel path is provided by pilot line 12 and idle port 10 for fuel and air channel 10A.

When the engine is off, fuel valve 15 is closed, thus preventing fuel 11 flowing into jet 9. Furthermore, butterfly valve 4 is closed.

FIG. 1 shows the system of the present invention set for the engine to run at idle speed. The butterfly valve 4 at an idle position, closes off the air flow 8 passing to the engine via the butterfly valve 4. The flow of air 8 at the idle position of valve 4 is considered too low to draw fuel from jet 9 and fuel valve 15 is closed. Accordingly, an alternate path is provided to allow for gaseous fuel to enter the engine, comprising an idle port 10 which serves as a junction of fuel line 12 and air channel 10A. Air and fuel is mixed in the idle port proximate the junction of line 12 and channel 10A. Low pressure gaseous fuel 11 is derived from an onboard gaseous fuel tank (not shown) and passes via a converter to port 11 and also pilot line 12, to the idle port 10.

FIG. 1 shows the path of air flow 8 via channel 10A, fuel flow via line 12 and the flow of fuel/air mixture. The carburetor may contact the engine intake manifold directly or contact an intermediate passage.

An idle adjustment screw 14 provides an adjustment of the amount of fuel flow and hence the fuel/air ratio at low r.p.m. of the engine.

A fuel valve of the present invention provides a means by which the amount of gaseous fuel can be regulated and controlled over the entire operating range of the engine in order to optimise the fuel/air ratio of the combustible mixture entering the engine.

Fuel valve 15 serves to regulate the flow of gaseous fuel 11 by means of valve member 16 and seat 17. As shown in FIG. 1, the valve member 16 abuts seat 17 and therefore no fuel is allowed to flow into jet 9. Fuel for engine idling only flows via pilot line 12.

Figure 2:
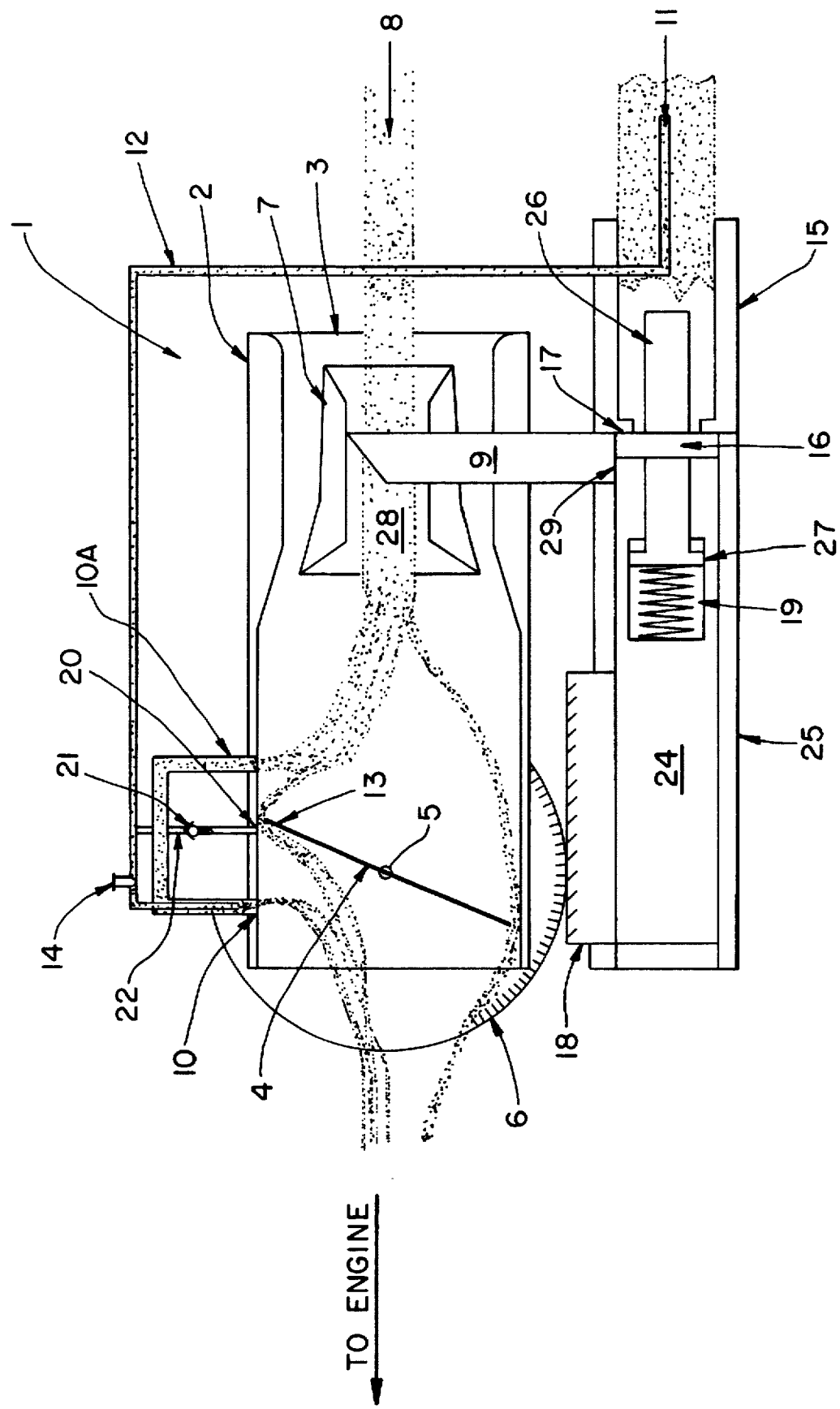
FIG. 2 shows the combination set for initial engine acceleration.

FIG. 2 shows operation of the fuel delivery system of the present invention as the butterfly valve 4 is moved to a slightly open position so as to accelerate the engine from idle to low speed (just above idle speed).

The flow of idle fuel/air mixture via idle port 10, including fuel flow via line 12 and air flow via channel 10A continues only as long as there is enough vacuum at port 10.

As shown in FIG. 2, as the accelerator is depressed, the valve 4 is moved to beyond progression port 20. The vacuum at the progression port 20 opens valve 21 and provides more fuel 11 into the air flow passing by one opening created by movement of butterfly valve 4, at point 13 in addition to the fuel mixture emanating from idle port 10. As the engine speed increases from idle, this additional fuel supplied to port 20 is required to maintain the correct air/fuel mixture.

A port valve 21 comprising pressure sensitive needle and seat valve 22 senses the increased air flow 13 and opens to allow additional fuel into the carburetor, which fuel is mixed with the passing air 13 for combustion by the engine.

The fuel valve 15 also includes a resilient mechanism 19 which serves to further control the operation of member 16 and the flow of fuel 11, thus at this time, valve 15 remains closed so that no fuel 11 passes through jet 9.

The gear 6 coupled to shaft 5 rotates as the butterfly valve 4 is opened. The gear 6 moves rack 18 which in turn serves to move valve plunger 24 outwardly relative to valve body 25.

The resilient mechanism 19 serves to delay the flow of gaseous fuel into jet 9 at idle or low engine speeds.

Figure 3:
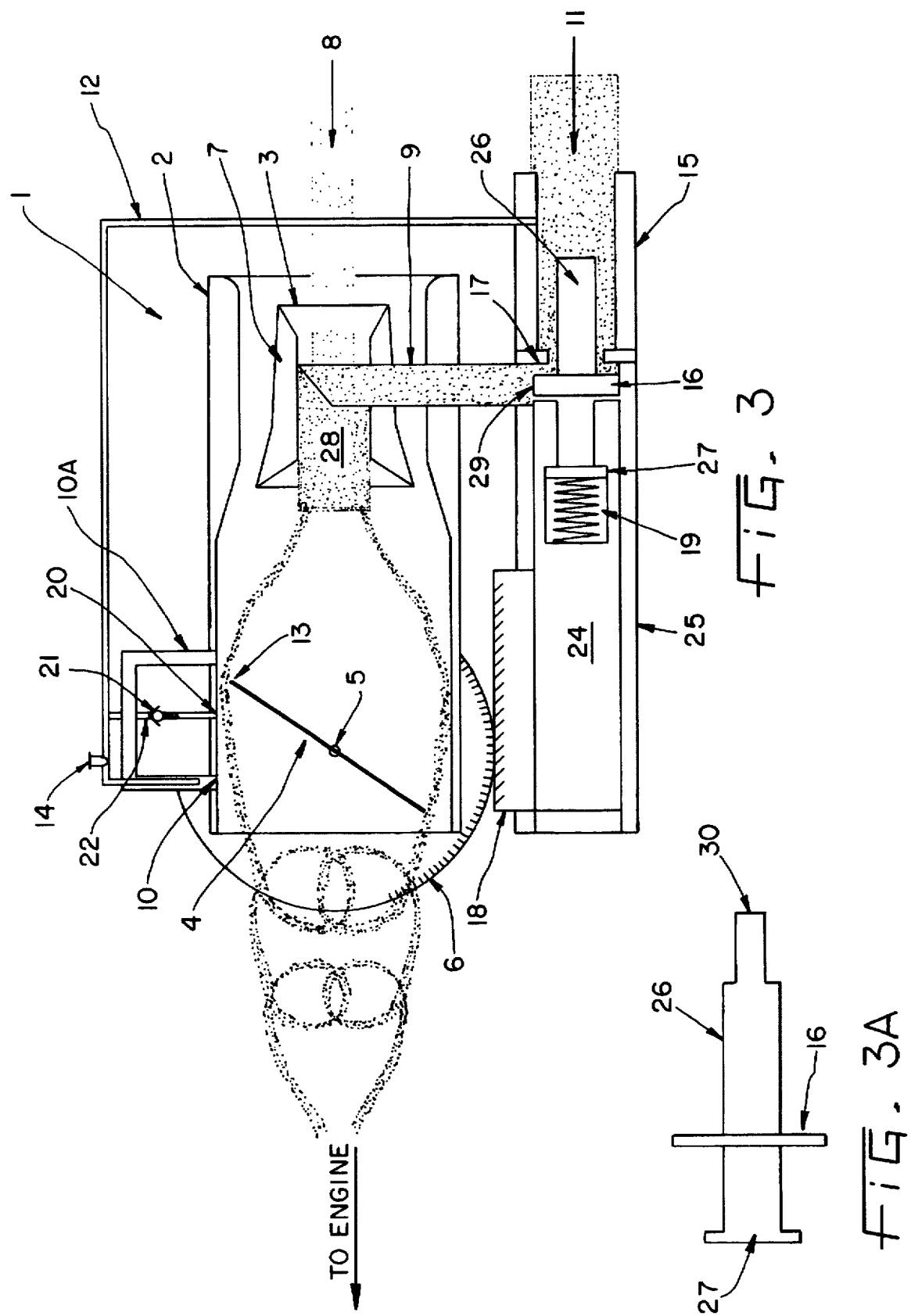
FIG. 3 shows the combination at a setting for higher engine RPM.

FIG. 3 illustrates a further step in the acceleration of the engine from low to higher speed. The resilient mechanism 19 serves to bias valve member 16 against seat 17 to close valve 15 when the butterfly valve 4 is at idle or low speed positions. However, as the butterfly valve 4 is opened and gear 6 moves rack 18 further outwardly, the plunger 24 moves to engage the top 27 of projection 26 and move the projection 26 further outwardly and move valve member 16 away from seat 17 to open valve 15 and permit fuel 11 to flow into jet 9. Air flow 8 passes around and through venturi diffuser 7. Air flow around venturi diffuser 7 creates an acceleration of air in the throttle body, which in turn creates "low pressure" area 28. Fuel from jet 9 is drawn to low pressure area 28 together with air flow through the venturi and is mixed within region 28 in venturi 7.

The low pressure area 28 created by the venturi diffuser 7 is relatively strong. Thus, it is important to directly or operatively couple the regulation of gas supply, for example by a needle/seat arrangement, to engine r.p.m., in order to obtain metering of gas flow to air flow (into engine) throughout the engine's rev. range. The coupling can be achieved in many ways, by lever, cable, other known mechanisms or rack and gear as herein preferred. The metering of gas to air flow enables precise ratios of fuel/air to be obtained and optimised for each particular engine.

The further jet 9 is placed into venturi air flow 8, thus enabling the gaseous fuel to be drawn into the low pressure area 28, and with the air flow, create a fuel mixture for combustion.

Figure 7:
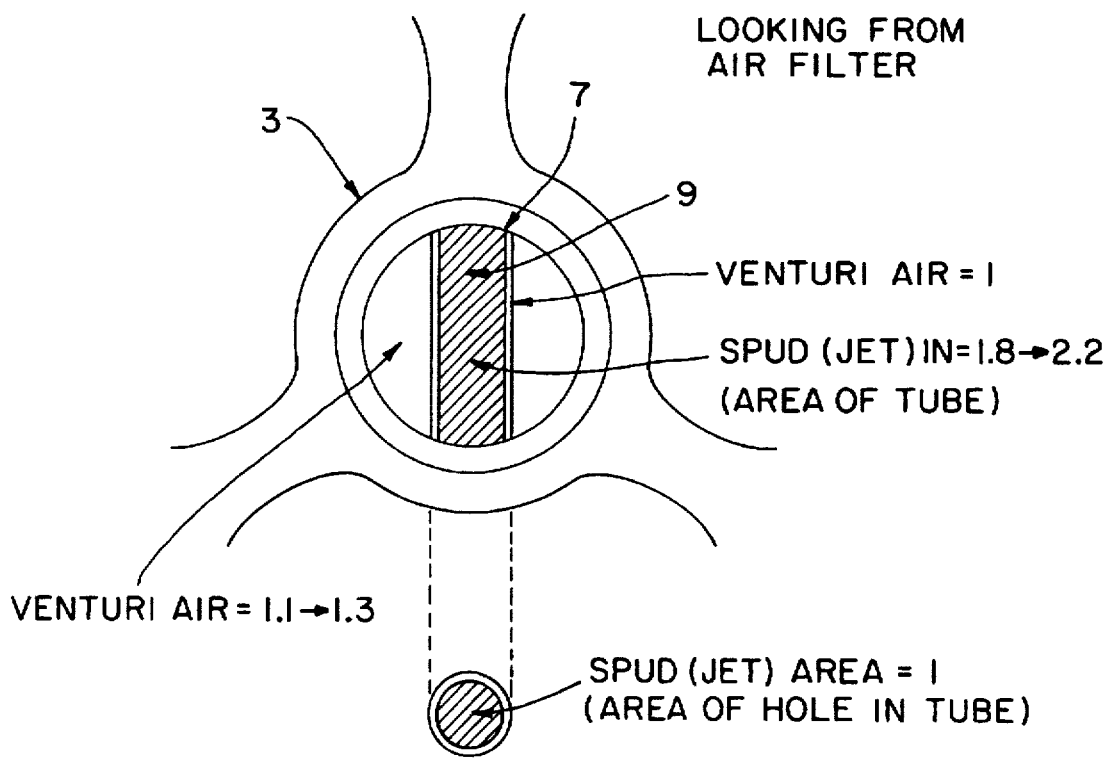
FIG. 7 shows a preferred jet positioning in the venturi.

FIG. 7 shows a preferred positioning of jet 9 in venturi diffuser 7. The upper figure shows a view looking down into venturi 3. The ratio of area occupied by jet 9 to the area available for air to pass by jet 9 is 1 to 3, preferably 1.8 to 2.2, and most preferably 2.0. That is, the jet occupies an area of between 1 to 3 times more than the area available for air.

The lower figure shows in cross-section, an end view of jet 9. Preferably the ratio of area occupied by jet 9 to the air area is 0.5 to 2, preferably 1.1 to 1.3.

Referring to FIG. 3, as the butterfly valve 4 is opened further for higher engine speed, valve 15 is proportionately opened to allow more fuel into the venturi diffuser for mixing with air to form a combustible air/fuel mixture. The projection 26 may be tapered or stepped to provide a larger orifice for fuel flow through valve 15.

In order to obtain correct or optimum ratios of fuel and air throughout engine operating range, projection 26 can be contoured and shaped to a predetermined configuration. Thus a narrowing of projection 26 will enable more fuel 11 to flow into jet 9 for higher engine r.p.m. or richer air/fuel mixtures. The converse also applies.

FIG. 3A shows an enlarged view of projection 26. The amount of fuel drawn in via jet 9 depends on engine speed and air flow around and through venturi diffuser 7 creating the low pressure area 28 into which fuel is drawn as regulated by the size of the orifice in valve 15 between valve 16 and seat 17. The size of the orifice in valve 15 may be increased for higher engine speed, or richer fuel mixtures, by tapering or stepping the diameter of projection 26. As the valve member 16 is moved further outward, more space is created between valve member 16 and seat 17. The size of this space determines the amount of fuel 11 entering jet 9. The amount of fuel 11 entering jet 9 is also determined inversely by the volume occupied by projection 26 in the opening defined by seat 17. Thus, if the projection 26 is contoured in its outer shape, more or less fuel 11 can pass by seat 17 and enter jet 9. This is particularly so when the valve member 16 is moved outwardly beyond end 29 of jet 9.

Accordingly, at an end 30 of projection 26, there is provided a narrowing as an example embodiment. In operation, when end 30 is moved so as to sit near seat 17, a larger gap for fuel 11 to flow through into jet 9 is provided between end 30 and seat 17.

It is anticipated that the projection 26 is to be contoured on its surface in such a way, for each make and size of engine, so as to provide optimum fuel/air ratio of combustible mixture entering an engine throughout the engine's operating range.

When the driver of the automobile lifts their foot from the accelerator pedal this serves to return butterfly valve 4 to its idle position and close valve 15 and the engine then decelerates as shown in FIG. 1. The closure of valve 15 reduces significantly the flow of fuel 11 into jet 9, and hence the quantity of unburnt gas passing to exhaust.

It has also been found that if seat 17 is formed as a projection into the path of the flow of fuel 11, more accurate control of fuel flow into jet 9 can be achieved. A turbulent flow is created in fuel flow proximate seat 17.

Furthermore, it has been found that the shape or configuration of the venturi diffuser 7 serves to enhance the performance of the fuel delivery system of the present invention.

Figure 6:
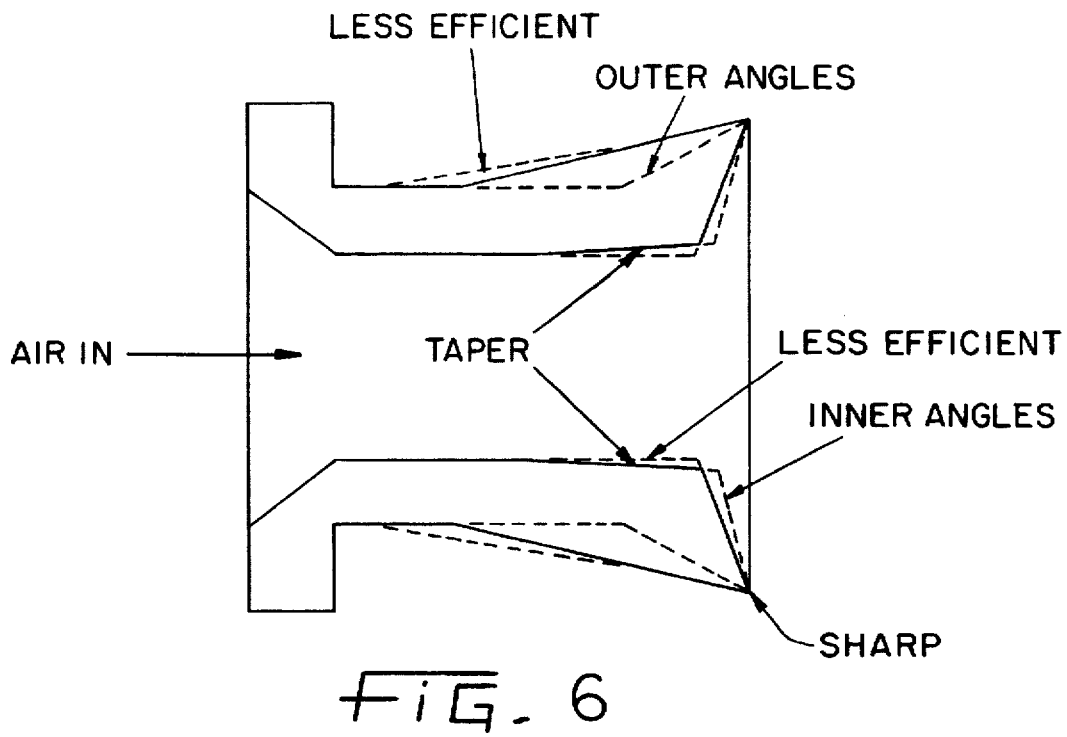
FIG. 6 shows a preferred form of venturi diffuser.

FIG. 6 shows a preferred form of venturi diffuser 7. The solid shape is a most preferred form, whereas the shapes denoted by dotted lines have been found to work less efficiently. The solid shape has a slight taper on its internal surface (venturi) and a flaring on the outer surface (diffuser).

Figure 4:
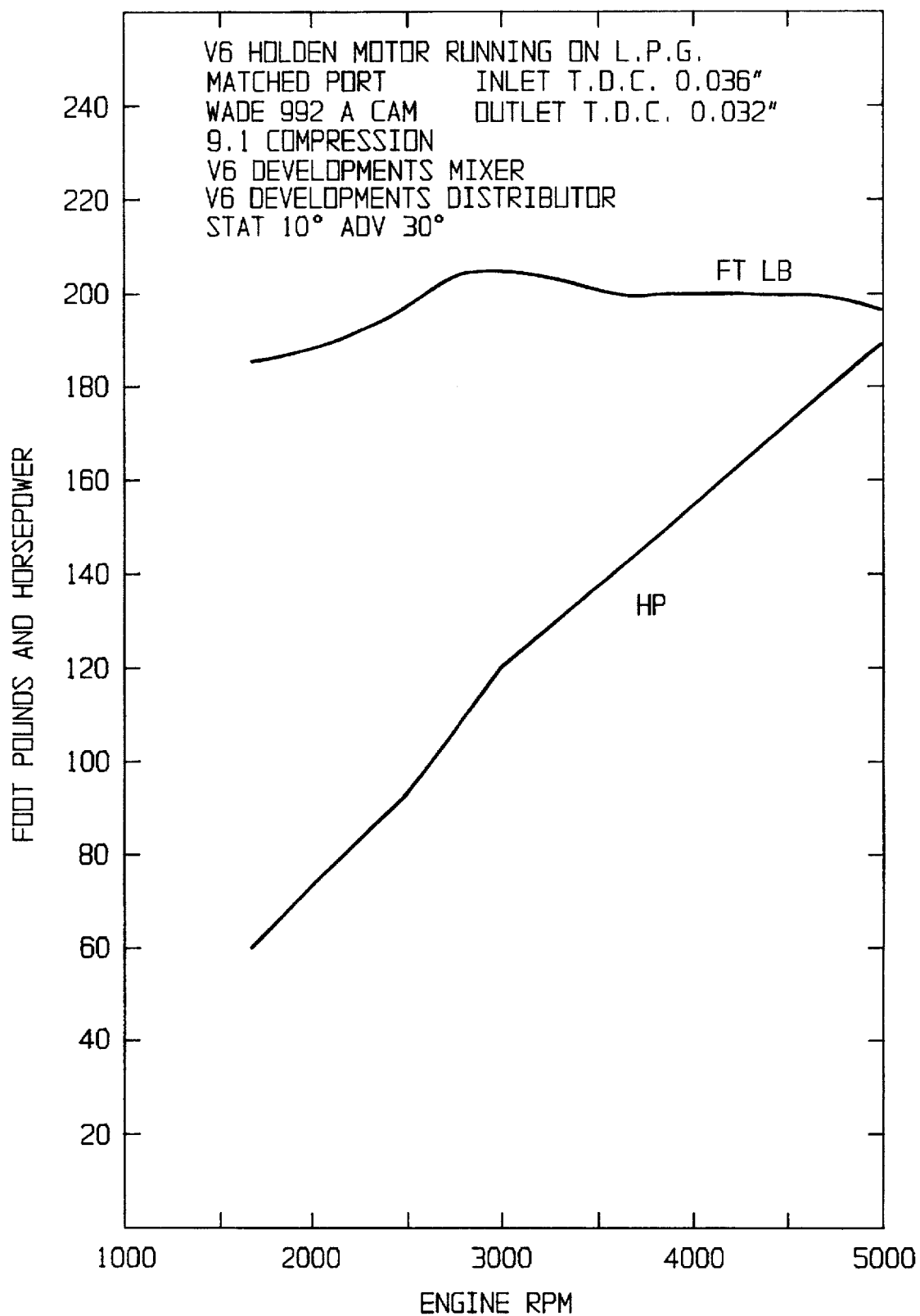
FIG. 4 shows torque and horse-power output from an engine fitted with the system of the present invention.

FIG. 4 shows graphically horsepower (HP) and torque (FTID) output of a 3.8 litre V6 GMH engine using the fuel delivery system of the present invention.

Figure 5:
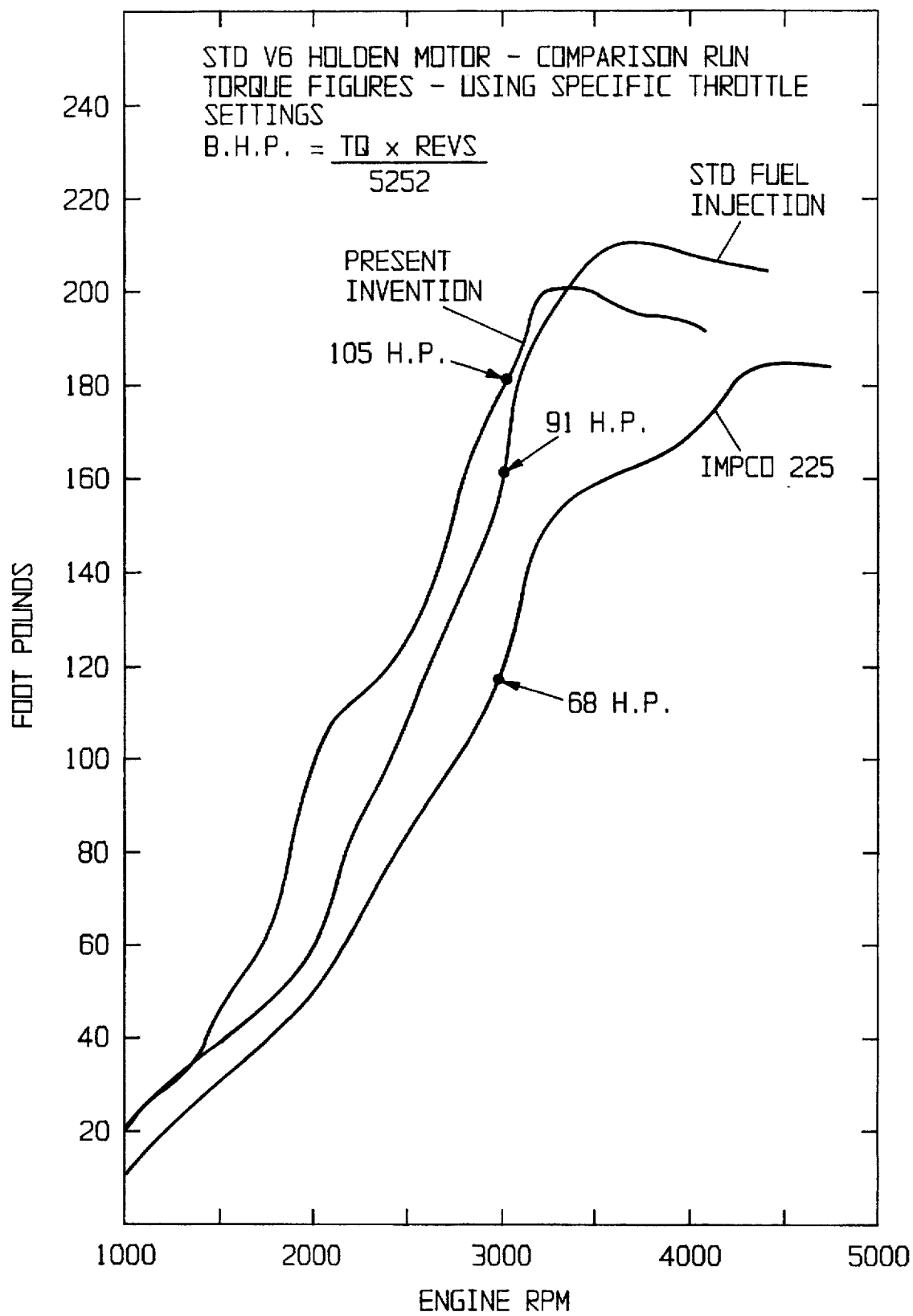
FIG. 5 shows comparison torque curves of an engine.

FIG. 5 shows an approximate comparison of torque output of a 3.8 litre V6 GMH engine running on various fuels. At 3000 r.p.m. a prior art LPG conversion unit branded IMPCO 225 produces 68 horsepower (HP). The engine running on petrol fuel injection produces 91 HP, whereas using the fuel delivery system of the present invention, the engine running on LPG fuel produces 105 HP.

Modifications relating to the invention disclosed above will now be described.

Figure 8:
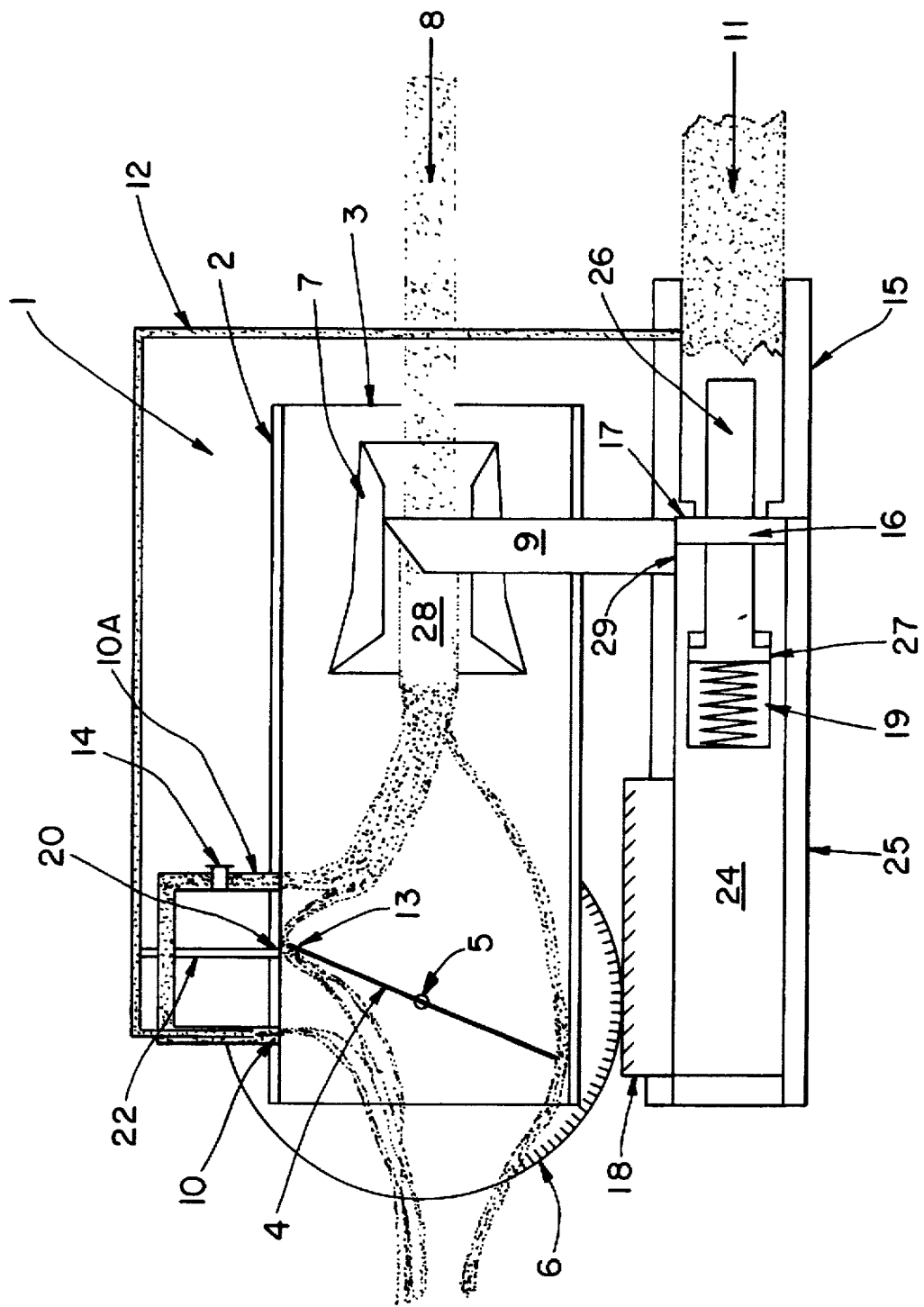
FIG. 8 shows modifications relating to the structure of the carburetor and valve system disclosed in FIGS. 1, 2 and 3.

With regard to FIG. 8, the body 2 is shown with relatively parallel walls. That is, the thickening shown at the venturi end of the carburetor body has been found not to be essential, in one form of the invention.

Furthermore, the valve 21 as disclosed above may be deleted, however the port 20 still remains.

Idle adjustment screw 14 has been moved to channel 10A. It has been found that the function of the idle adjustment is more effective if placed in the air flow path rather than the fuel flow path. Furthermore, it has been found that the adjustment screw, if placed in the fuel path, is not an accurate method of regulation of idle adjustment. The gas flow in path 12 has been found to be too small to affect accurate regulation.

It has also been found that, in general, with regard to the present invention, the air:fuel ratio should be of the order of 10:1 to 20:1 dependent on the engine, and preferably 13:1 for most I.C. engines on the market today. It has been found that there are a number of ways in which the air:fuel ratio can be effected. The ratio is determined by the proportions of the area occupied by the venturi air, the diffuser, the jet and the size and/or contour of projection, an example of which is shown in FIGS. 3A and 7.

The present invention is also applicable to many various gaseous fuels including methane, LPG and CNG.

Figure 9:
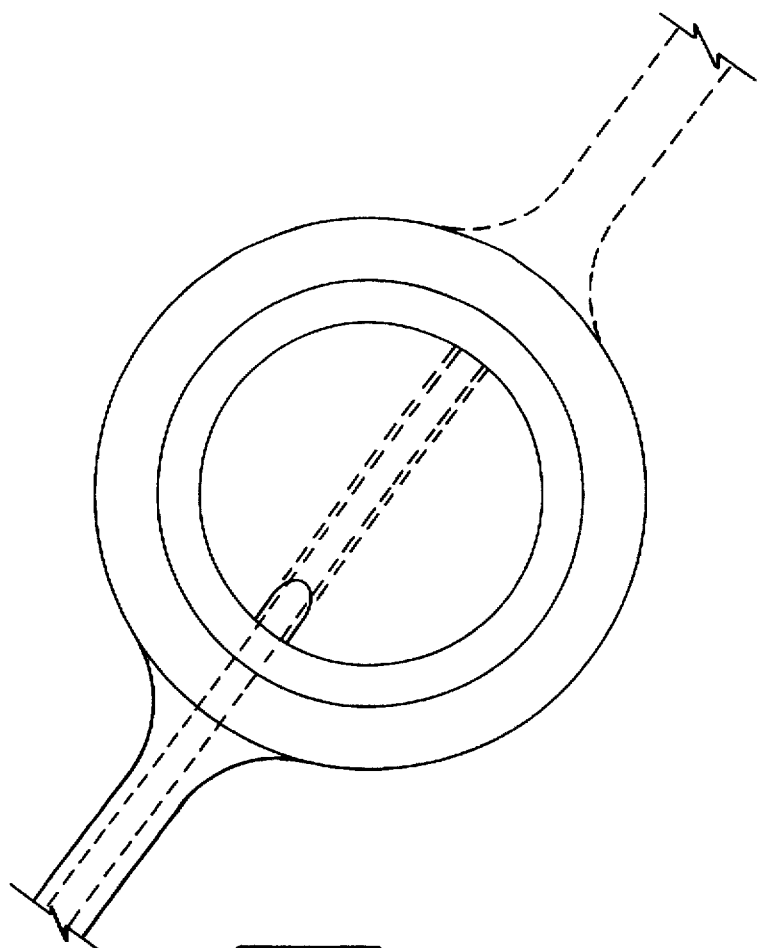
FIG. 9 relates to a modification of FIG. 7.
Figure 9A:
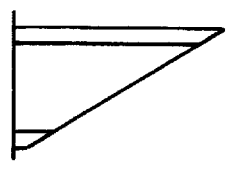
Figure 9B:
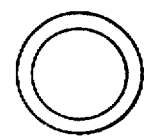

With regard to FIG. 9, it has been found not to be necessary to provide three legs holding the venturi 3 in place. Furthermore, the jet or spud may extend through the one leg as shown in dotted lines. The end of the jet at which the gas flow from which the gas flow is emitted may terminate anywhere within the inner area of the venturi (shown in dotted lines). Preferably the end of the spud is terminated at an angle travelling from its upper most tip down to the bore of the venturi. The area, in plan view, of the angled end of the spud has relevance in determining air:fuel ratio. The greater the angle of the spud end, the more area occupied by the spud in the venturi, therefore more fuel may be introduced into the air flowing through the venturi.

Figure 10B:
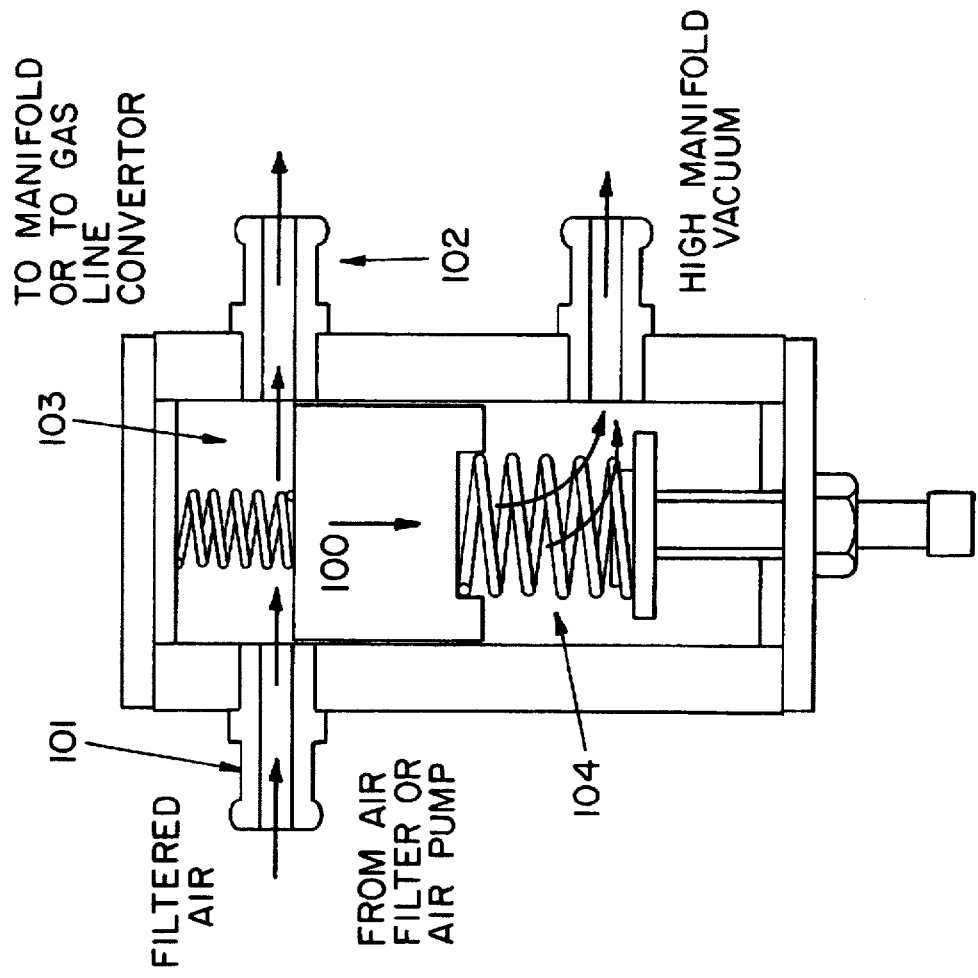
FIGS. 10A and 10B show an air pass valve for use in conjunction with the present invention.
Figure 10A:
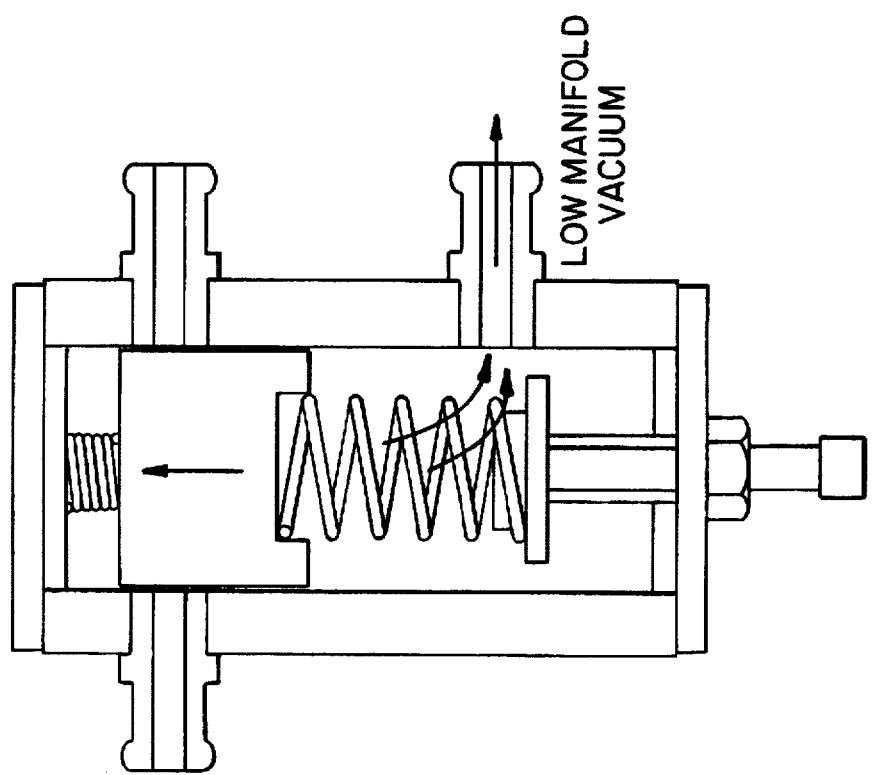

FIGS. 10A and 10B show an air pass valve which may be used in conjunction with the present invention although is equally applicable to petrol or other fueled engines. FIG. 10A shows the valve in a closed position and FIG. 10B shows the valve in an open (pass) position.

The valve may be placed in connection with the manifold (to engine in FIG. 2), gas input (11) or high/low pressure fuel converter.

The purpose of the valve is to reduce fuel consumption in conditions of deceleration of the engine. In FIG. 2, when the butterfly 4 is closed, high manifold vacuum causes fuel to flow via bypass circuit 10 and 12. The valve as disclosed, in such conditions, will open to an air pass position and allow air to pass through the fuel delivery system and thus provide air rather than fuel into the manifold of the engine in response to a condition of high manifold vacuum. The quantity and timing of air must be regulated in order to avoid the engine stalling and this can be set in accordance with the fuel/air requirements of each engine type.

Under conditions of high vacuum, piston 100 is drawn down. The amount of piston movement is dependent on the amount of vacuum and piston size. The example shows a piston of preferably 20 mm diameter and ports 101, 102 of 4 mm diameter. Springs 103 and 104 also serve to regulate the amount of piston movement. Spring 103 also serves to return or bias piston 100 towards a 'home' (closed) position under reduced or nil manifold vacuum.

I claim:

1. An apparatus for mixing gaseous fuel with air passing through a carburetor of an internal combustion engine, the carburetor having a hollow main body portion through which a stream of air is adapted to enter at one end, the hollow main body having an interior surface defining in part a carburetor interior volume, comprising:

a venturi diffuser disposed in the carburetor, said venturi diffuser having an inlet end, an outlet end, an interior surface defining a bore and an exterior surface;

a first air stream passage defined in part by said bore through which a first air stream passes;

an induction tube having an inlet and an outlet, said induction tube inlet adapted to be connected to a source of gaseous fuel, said induction tube extending into and being disposed inside said bore whereby gaseous fuel from said induction tube outlet is directly introduced into said first air stream; and a second air stream passage defined in part by said venturi diffuse exterior surface and a portion of the carburetor interior surface through which a second air stream passes, said second air stream passage having a low pressure zone located downstream, in the flow direction of said second air stream, of said induction tube outlet, whereby said second air stream is accelerated through said second air stream passage to mix with the fuel and said first air stream.

2. The apparatus according to claim 1, wherein said venturi diffuser is generally tubular and said exterior surface is flared thereof along the flow direction of said second air stream to create said low pressure zone.

3. The apparatus according to claim 2, wherein said venturi diffuser exterior surface is flared so as to create a continuously narrowing constriction of said second air stream passage.

4. The apparatus according to claim 1, wherein said bore is tapered along the flow direction of said first air stream.

5. The apparatus according to claim 1, wherein said induction tube is connected to one of methane, liquid petroleum gas (LPG) and compressed natural gas (CNG) sources of fuel.

6. A fuel delivery system for use with a carburetor of an internal combustion engine to mix gaseous fuel with air passing through the carburetor, the carburetor having a hollow main body portion through which a stream of air is adapted to enter at one end, the hollow main body having an interior surface defining in part a carburetor interior volume, comprising:

a venturi diffuser disposed in the carburetor, said venturi diffuser having an inlet end, an outlet end, an interior surface defining a bore and an exterior surface;

a first air stream passage defined in part by said bore through which a first air stream passes;

an induction tube having an inlet and an outlet, said induction tube inlet adapted to be connected to a source of gaseous fuel, said induction tube outlet extending into and being disposed inside said bore whereby gaseous fuel is directly introduced into said first air stream;

a second air stream passage defined in part by said venturi diffuser exterior surface and a portion of the carburetor interior surface through which a second air stream passes, said second air steam passage having a low pressure zone located downstream, along the flow direction of said second air stream, of said induction tube outlet, whereby said second air stream is accelerated through said second air stream passage to mix with the fuel and said first air stream; and a fuel valve connected between said induction tube inlet and the source of fuel, said fuel valve operatively coupled to a fuel/air flow controller, said fuel valve controlling the flow of fuel into said induction tube inlet in response to the operation of said fuel/air flow controller.

7. The fuel delivery system according to claim 6, wherein said venturi diffuser is generally tubular and said exterior surface thereof is flared along the flow direction of said second air stream to create said low pressure zone.

8. The fuel delivery system according to claim 7, wherein said venturi diffuser exterior surface is flared so as to create a continuously narrowing constriction of said second air stream passage.

9. The fuel delivery system according to claim 6, wherein said bore is tapered along the flow direction of said first air stream.

10. The fuel delivery system according to claim 6, wherein said fuel valve includes a valve member and a mating seat, said valve member including a projection contoured to permit a predetermined flow of fuel through said fuel valve for a given position of said fuel valve.

11. The fuel delivery system according to claim 10, wherein a portion of said projection is disposed in the flow path of the fuel.

12. The fuel delivery system according to claim 6, wherein said fuel/air flow controller comprises a butterfly valve disposed in the carburetor, said butterfly valve operatively coupled to said fuel valve, said butterfly valve adapted to control the flow of fuel/air mixture to the engine for combustion.

13. The fuel delivery system according to claim 12, wherein said fuel valve is adapted for translational movement in response to a movement of said butterfly valve.

14. The fuel delivery system according to claim 13, wherein said fuel valve is operatively coupled to said butterfly valve by a gear mechanism, said gear mechanism including a gear operatively coupled to said butterfly valve and a gear rack operatively coupled to said fuel valve.

15. The fuel delivery system according to claim 6, wherein said induction tube is connected to one of methane, liquid petroleum gas (LPG) and compressed natural gas (CNG) sources of fuel.

16. An apparatus for mixing gaseous fuel with air passing through a carburetor of an internal combustion engine, the carburetor having a hollow main body portion through which a stream of air is adapted to enter at one end, the hollow main body having an interior surface defining in part a carburetor interior volume, comprising:

a generally tubular venturi diffuser disposed in the carburetor, said venturi diffuser having an inlet end, an outlet end, an interior surface defining a bore and an exterior surface;

a first air stream passage defined in part by said bore through which a first air stream passes;

an induction tube having an inlet and an outlet, said induction tube inlet adapted to be connected to a source of gaseous fuel, said induction tube extending into and being disposed inside said bore whereby gaseous fuel from said induction tube outlet is directly introduced into said first air steam; and a second air stream passage defined in part by said venturi diffuser exterior surface and a portion of the carburetor interior surface through which a second air stream passes, said second air stream passage having a low pressure zone located downstream, in the flow direction of said second air stream, of said induction tube outlet, whereby said second air stream is accelerated through said second air stream passage to mix with said fuel and first air stream.

17. The apparatus according to claim 16, wherein said venturi diffuser exterior surface is flared along the flow direction of said second air stream to create said low pressure zone.

18. The apparatus according to claim 17, wherein said venturi diffuser exterior surface is flared so as to create a continuously narrowing constriction of said second air stream passage.

19. The apparatus according to claim 16, wherein said bore is tapered along the flow direction of said first air stream.

* * * * *